(12) United States Patent
Yasui

(10) Patent No.: US 11,580,340 B2
(45) Date of Patent: Feb. 14, 2023

(54) COMPUTER-READABLE MEDIUM, ELECTRONIC DEVICE, AND METHOD FOR CAUSING IMAGE PROCESSING DEVICE TO PERFORM PRELIMINARY OPERATION

(71) Applicant: BROTHER KOGYO KABUSHIKI KAISHA, Nagoya (JP)

(72) Inventor: Ryo Yasui, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/350,087

(22) Filed: Jun. 17, 2021

(65) Prior Publication Data

US 2021/0397911 A1    Dec. 23, 2021

(30) Foreign Application Priority Data

Jun. 19, 2020   (JP) .............................. JP2020-105865

(51) Int. Cl.
| | |
|---|---|
| *G06F 15/00* | (2006.01) |
| *G06K 15/02* | (2006.01) |
| *H04N 1/00* | (2006.01) |
| *G01S 13/04* | (2006.01) |
| *G01S 13/06* | (2006.01) |

(52) U.S. Cl.
CPC .......... *G06K 15/1809* (2013.01); *G01S 13/04* (2013.01); *G01S 13/06* (2013.01); *H04N 1/00395* (2013.01); *H04N 1/00413* (2013.01); *H04N 1/00896* (2013.01)

(58) Field of Classification Search
CPC ........... H04N 1/00395; H04N 1/00413; H04N 1/00896

USPC ........................................................ 358/1.15
See application file for complete search history.

(56) References Cited

U.S. PATENT DOCUMENTS

| | | | |
|---|---|---|---|
| 2014/0376020 A1 | 12/2014 | Imamura | |
| 2017/0251124 A1* | 8/2017 | Yasui ................. | H04N 1/00307 |
| 2018/0352105 A1* | 12/2018 | Yamada .............. | B41J 13/0009 |
| 2020/0026360 A1* | 1/2020 | Baheti .................... | G01S 13/06 |

FOREIGN PATENT DOCUMENTS

JP     2019-057919 A     4/2019

* cited by examiner

*Primary Examiner* — Mark R Milia
(74) *Attorney, Agent, or Firm* — Scully Scott Murphy and Presser

(57) ABSTRACT

A non-transitory computer-readable medium stores computer-readable instructions configured to, when executed by a processor of an electronic device, cause the electronic device to display on a screen of a display an object for receiving an instruction to cause the electronic device to perform a specific operation including controlling an image processing device, obtain a position of the object in the screen, obtain a position of the indicator based on output signals from a millimeter wave radar, determine whether the position of the indicator is within a particular range relative to the position of the object, and when determining that the position of the indicator is within the particular range, transmit to the image processing device a preliminary operation command instructing the image processing device to start a preliminary operation to shorten a time required to complete the specific operation.

14 Claims, 6 Drawing Sheets

COMPUTER-READABLE MEDIUM, ELECTRONIC DEVICE, AND METHOD FOR CAUSING IMAGE PROCESSING DEVICE TO PERFORM PRELIMINARY OPERATION

CROSS-REFERENCE TO RELATED APPLICATION

This application claims priority under 35 U.S.C. § 119 from Japanese Patent Application No. 2020-105865 filed on Jun. 19, 2020. The entire subject matter of the application is incorporated herein by reference.

BACKGROUND

Technical Field

Aspects of the present disclosure are related to a computer-readable medium, an electronic device, and a method for causing an image processing device to perform a preliminary operation.

Related Art

Technologies have been proposed in which an image processing device starts a preliminary operation to complete a specific operation earlier, prior to receiving an instruction to cause the image processing device to perform the specific operation. For instance, a technology has been known in which an image processing device comes back into a normal power mode after cancellation of a power-saving mode as a preliminary operation to complete image processing sooner, when a human sensor of the image processing device detects an object during the power-saving mode.

SUMMARY

In the known technology, the image processing device cancels the power-saving mode, for instance, in response to a person approaching the image processing device. Hence, the power-saving mode is canceled even in cases where the power-saving mode needs not be cancelled, such as when a person happens to pass by the image processing device for some reason other than using the image processing device. In such cases, the image processing device performs unnecessary preliminary operations.

Aspects of the present disclosure are advantageous to provide one or more improved techniques that make it possible for an electronic device to cause an image processing device to efficiently perform a preliminary operation to complete a specific operation earlier.

According to aspects of the present disclosure, a non-transitory computer-readable medium is provided, which stores computer-readable instructions executable by a processor of an electronic device including a millimeter wave radar and a display. The instructions are configured to, when executed by the processor, cause the electronic device to display an object on a screen of the display, the object being configured to, when operated by an indicator, receive an instruction to cause the electronic device to perform a specific operation, the specific operation including controlling an image processing device, obtain a position of the object in the screen of the display, obtain a position of the indicator based on output signals from the millimeter wave radar, at least while the object is displayed on the screen of the display, determine whether the obtained position of the indicator is within a particular range relative to the obtained position of the object, and when determining that the obtained position of the indicator is within the particular range relative to the obtained position of the object, transmit a preliminary operation command to the image processing device, the preliminary operation command instructing the image processing device to start a preliminary operation to shorten a time required to complete the specific operation.

According to aspects of the present disclosure, further provided is an electronic device that includes a millimeter wave radar, a display, and a controller. The controller is configured to display an object on a screen of the display, the object being configured to, when operated by an indicator, receive an instruction to cause the electronic device to perform a specific operation, the specific operation including controlling an image processing device, obtain a position of the object in the screen of the display, obtain a position of the indicator based on output signals from the millimeter wave radar, at least while the object is displayed on the screen of the display, determine whether the obtained position of the indicator is within a particular range relative to the obtained position of the object, and when determining that the obtained position of the indicator is within the particular range relative to the obtained position of the object, transmit a preliminary operation command to the image processing device, the preliminary operation command instructing the image processing device to start a preliminary operation to shorten a time required to complete the specific operation.

According to aspects of the present disclosure, further provided is a method implementable on a processor of an electronic device including a millimeter wave radar and a display. The method includes displaying an object on a screen of the display, the object being configured to, when operated by an indicator, receive an instruction to cause the electronic device to perform a specific operation, the specific operation including controlling an image processing device, obtaining a position of the object in the screen of the display, obtaining a position of the indicator based on output signals from the millimeter wave radar, at least while the object is displayed on the screen of the display, determining whether the obtained position of the indicator is within a particular range relative to the obtained position of the object, and when determining that the obtained position of the indicator is within the particular range relative to the obtained position of the object, transmitting a preliminary operation command to the image processing device, the preliminary operation command instructing the image processing device to start a preliminary operation to shorten a time required to complete the specific operation.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. The illustrative embodiment shows an application program (hereinafter, which may be simply referred to as an "application") incorporated in an electronic device (e.g., a smartphone) having a display screen.

Figure 1:
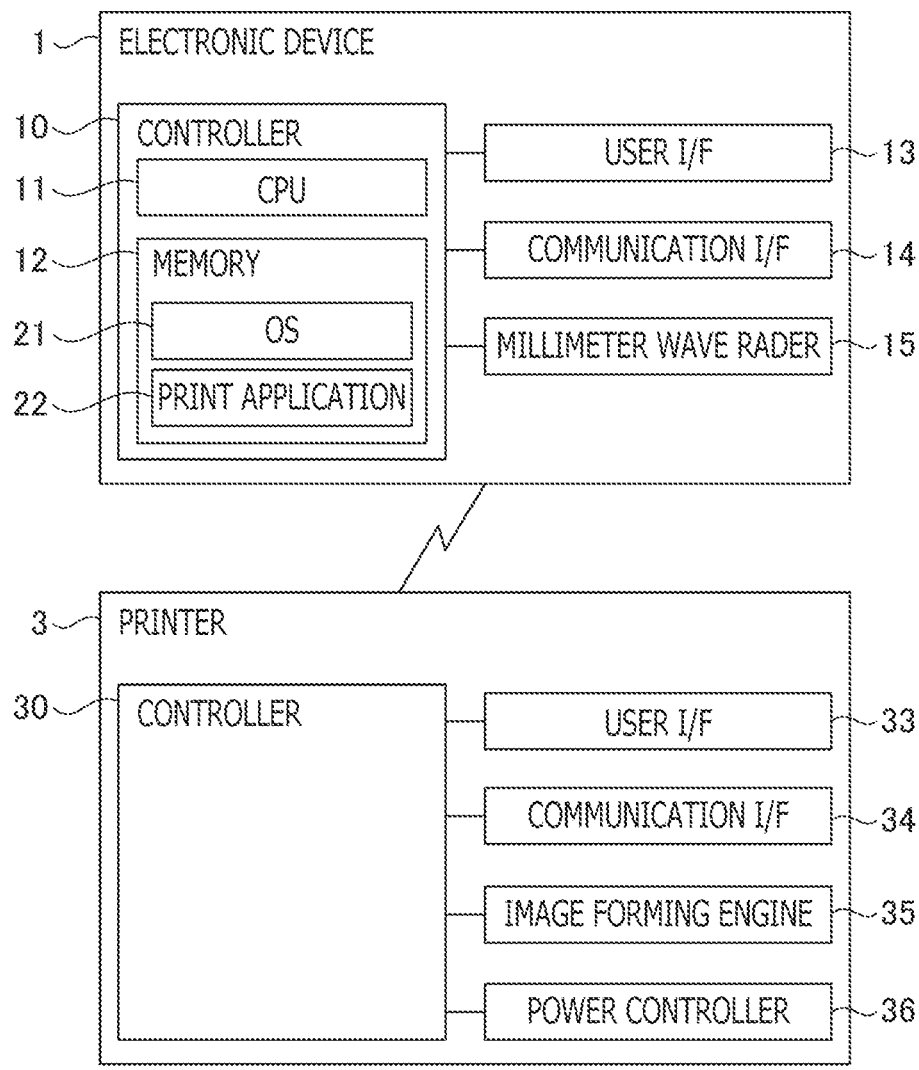
FIG. 1 is a block diagram schematically showing configurations of an electronic device and a printer connected with each other, in an illustrative embodiment according to one or more aspects of the present disclosure.

As shown in FIG. 1, an electronic device 1 of the illustrative embodiment has a controller 10 including a CPU 11 and a memory 12. Further, the electronic device 1 includes a user I/F ("I/F" is an abbreviation for "interface") 13, a communication I/F 14, and a millimeter wave radar 15, which are electrically connected with the controller 10. For instance, the electronic device 1 is configured to execute various applications for causing a printer 3 to perform printing. The controller 10 shown in FIG. 1 is a generic term for collectively representing hardware and software used to control the electronic device 1, but may not necessarily represent a single hardware element actually existing in the electronic device 1.

The CPU 11 performs various operations and processes according to programs read out of the memory 12 and based on user operations. The memory 12 may include a ROM, a RAM, and one or more non-volatile memories such as an HDD and a flash memory. The memory 12 stores various programs and data.

The user I/F 13 includes a display screen 131 as a hardware element having a display function. Specifically, the user I/F 13 includes a touch panel having both the display function and a function to receive a user operation. Namely, the electronic device 1 is configured to display on the display screen 131 an object for receiving a user operation and to accept the user operation to the object when an indicator (e.g., a user's finger) comes into contact with or presses the object being displayed.

The communication I/F 14 includes hardware configured to communicate with external devices such as the printer 3. The communication I/F 14 may use one or more communication methods, such as wired methods (e.g., USB) and wireless methods (e.g., Wi-Fi (registered trademark) and Bluetooth (registered trademark)). Further, the electronic device 1 may be configured to connect with the Internet via the communication I/F 14.

The millimeter wave radar 15 includes hardware configured to transmit electromagnetic waves, receive reflected waves of the electromagnetic waves, and output signals (hereinafter, which may be referred to as "waveform signals") with waveforms based on the received reflected waves. For instance, the millimeter wave radar 15 transmits frequency modulated signals having wavelengths on the order of millimeters or less and frequencies around 60 GHz, and receives the superposition of the reflected waves. The millimeter wave radar 15 outputs waveform signals based on the received reflected waves. Thereby, based on the signals output from the millimeter wave radar 15, the electronic device 1 is enabled to detect, for instance, a position and a movement of an object in the vicinity of the electronic device 1 with accuracy on the order of millimeters.

As shown in FIG. 1, an operating system (hereinafter referred to as an "OS") 21 and a print application 22 are incorporated in the memory 12 of the electronic device 1. The OS 21 is a multitasking OS configured to handle a plurality of tasks in parallel by managing and switching between the plurality of tasks. Examples of the OS 21 may include, but are not limited to, iOS (registered trademark), Android (registered trademark), Windows (registered trademark), macOS (registered trademark), and Linux (registered trademark).

The print application 22 is an application for producing printed materials using the printer 3. For instance, when receiving a print execution instruction from the user, the print application 22 (more exactly, the CPU 11 executing the print application 22) performs a process to generate a print command and transmit the generated print command to the printer 3. It is noted that the print application 22 of the illustrative embodiment may be a program executable independently based on a print execution instruction from the user, or may be a program configured to be invoked and executed by another program during execution of the said another program.

The printer 3 has at least a printing function and a communication function. The printer 3 is configured to perform operations corresponding to commands received from external devices such as the electronic device 1. For instance, when receiving a print command, the printer 3 performs a printing operation based on the received print command and produces a printed material.

As shown in FIG. 1, the printer 3 includes a controller 30 including a CPU and a memory, a user I/F 33, a communication I/F 34, an image forming engine 35, and a power controller 36. For instance, the printer 3 is a so-called label printer. The image forming engine 35 includes, for instance, a thermal transfer print head. The image forming engine 35 is configured to print an image on a label sheet that is wound and stored in a roll shape and convey the label sheet, thereby producing a label.

The power controller 36 controls the supply of electric power to the image forming engine 35. Specifically, the printer 3 is brought into a sleep state when the printer 3 continues not to receive any commands for more than a particular period of time. In the sleep state, the power controller 36 stops supplying electric power to the image forming engine 35, thereby reducing power consumption. In the sleep state, the printer 3 is allowed to receive an operation via the user I/F 33 and receive a command via the communication I/F 34, but is unable to produce a printed material. When receiving a print command in the sleep state, the printer 3 performs a return operation to switch from the sleep state to a non-sleep state before starting a printing operation, and starts the printing operation after completion of the return operation. As the return operation, the printer 3 starts supplying electric power to the image forming engine 35 by the power controller 36, and preheats the image forming engine 35 as needed. Thereby, the printer 3 becomes ready to perform the printing operation.

The printer 3 is further configured to receive commands other than the print command from external devices such as the electronic device 1 and perform operations corresponding to the received commands. For instance, when receiving a search command, the printer 3 transmits a particular response command to a sending source of the search command. The search command is a command sent by an external device to search for devices around the external device. Further, when receiving a status command requesting status information, the printer 3 transmits a signal indicating the status information to a sending source of the status command. The status information includes at least one of the following two types of information, i.e., information indicating a status (e.g., on standby, printing in progress, or error occurring) of the printer 3, and information indicating remaining amounts of consumables.

Figure 2:
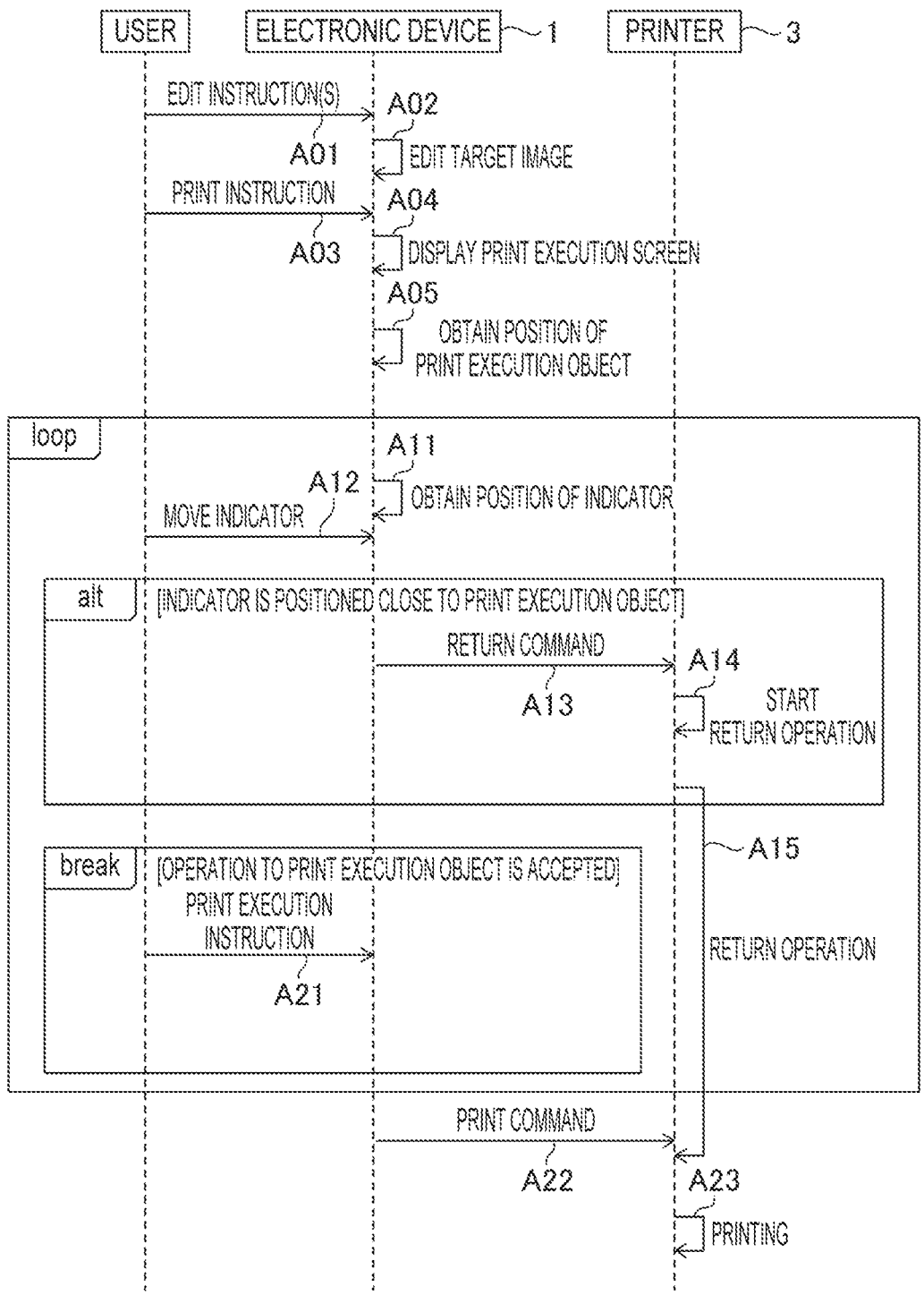
FIG. 2 is a sequence diagram showing an example of a sequence of operations when the electronic device causes the printer to perform printing in accordance with user operations, in the illustrative embodiment according to one or more aspects of the present disclosure.

Subsequently, the outline of a procedure to cause the printer 3 to perform printing by using the print application 22 will be described with reference to a sequence diagram shown in FIG. 2. Referring to FIG. 2, an explanation will be provided of a case where the printer 3 is in the sleep state at the time when the procedure is started. The print application 22 is executed by the CPU 11 of the electronic device 1.

The user launches the print application 22 on the electronic device 1, causes the user I/F 13 to display an edit screen configured to accept editing of a target image to be printed on the user I/F 13, and inputs edit instruction(s) (A01). The print application 22 receives an instruction to make a transition to the edit screen for editing the target image, for instance, on a top screen displayed immediately after the launch of the print application 22.

Figure 3:
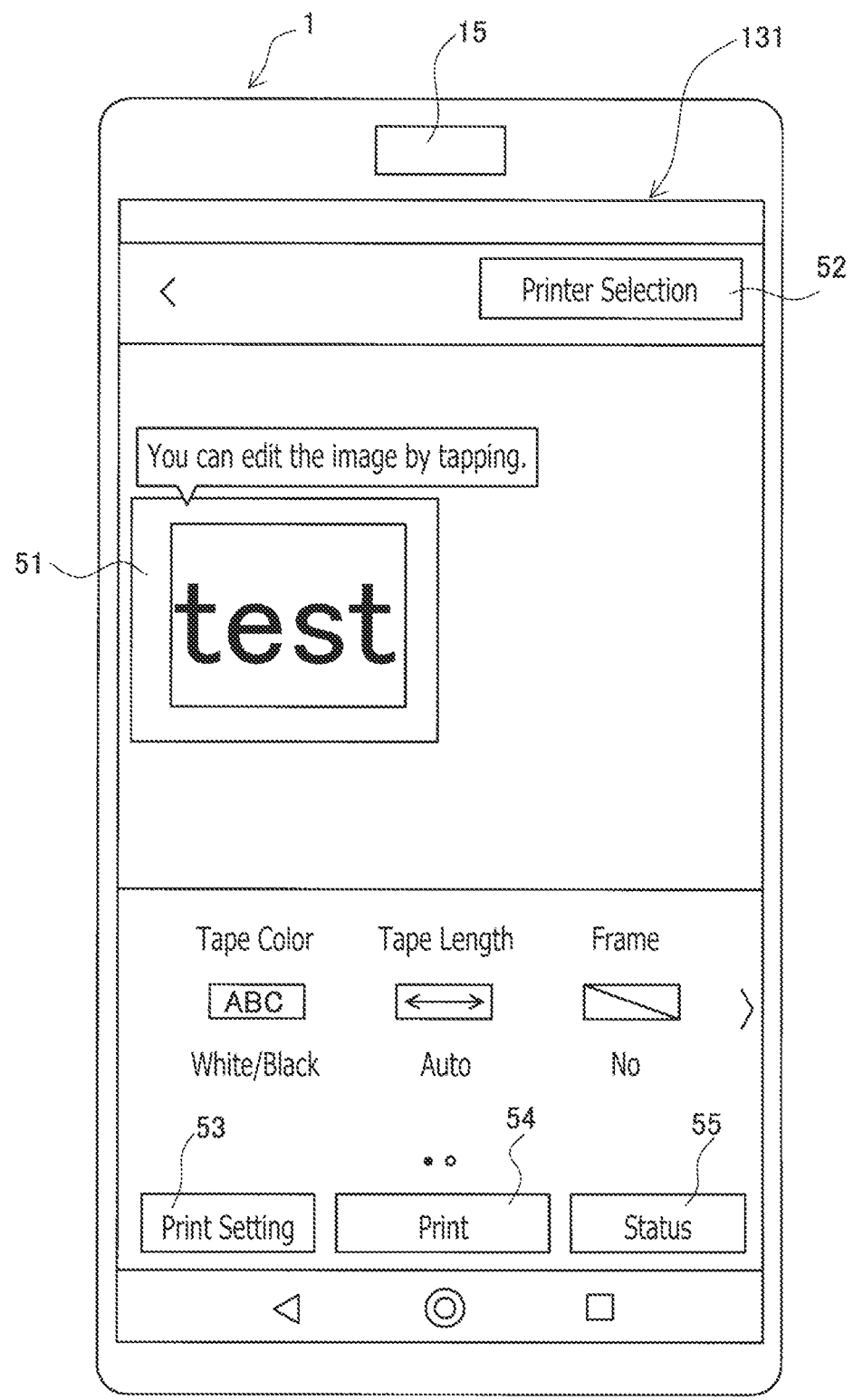
FIG. 3 shows an example of an edit screen displayed on the electronic device in the illustrative embodiment according to one or more aspects of the present disclosure.

FIG. 3 shows an example of an appearance of the electronic device 1 when the edit screen is displayed on the display screen 131. FIG. 3 shows an example of the edit screen for producing the label. FIG. 3 shows a surface of the electronic device 1 that includes the display screen 131 of the user I/F 13. As shown in FIG. 3, the display screen 131 is disposed substantially in a center of one side of a housing of the electronic device 1 in such a manner as to occupy almost the whole area of the one side. The millimeter wave radar 15 is disposed on the same surface of the electronic device 1 as the display screen 131, and is located in a surface region of the housing outside the display screen 131. Thus, the millimeter wave radar 15 is enabled to detect an object around the display screen 131.

The edit screen displays thereon a plurality of objects for receiving user operations. As shown in FIG. 3, for instance, the edit screen includes an edit object 51, a printer selection object 52, a print setting object 53, a print object 54, and a status object 55. The edit object 51 is an object for accepting editing of the target image to be printed. The printer selection object 52 is an object for accepting selection of a printer to perform printing. The print setting object 53 is an object for receiving an instruction to start editing print settings such as a color and a length of a tape (i.e., the label). The print object 54 is an object for receiving an instruction to make a transition to a print execution screen configured to receive a print execution instruction. The status object 55 is an object for receiving an instruction to display the status information of the selected printer.

When detecting an operation to make the indicator (e.g., a user's finger) contact or press a position within a range set for an object being displayed, the electronic device 1 determines that the operation to the object has been accepted. For instance, when accepting an operation to the edit object 51, the print application 22 becomes ready to receive edit instruction(s), edits the target image based on the received edit instruction(s) (A02), and displays the edited image on the edit screen. After completion of the editing, the user inputs a print instruction by operating to the print object 54 on the edit screen (A03).

When receiving the operation to the print object 54 on the edit screen (see FIG. 3), the print application 22 causes the user OF 13 to display the print execution screen (see FIG. 4) on the display screen 131 (A04). The print execution screen shown in FIG. 4 includes a print execution object 61. The print execution object 61 is an object for receiving an instruction to transmit a print command Specifically, when receiving an operation to the print execution object 61, the print application 22 performs a process to generate a print command and transmit the print command to the printer 3.

The print application 22 obtains a position of the print execution object 61 in the print execution screen displayed on the display screen 131 (A05). The position of each object is information to specify an area occupied by each object in the display screen 131. For instance, the position of an object may be indicated by coordinates of four corners of the object or by coordinates of each pixel contained in the object. The position of each object is predetermined in association with a shape and a size of the user I/F 13 of the electronic device 1, and a posture of the electronic device 1.

Then, the electronic device 1 activates the millimeter wave radar 15 to obtain the waveform signals output from the millimeter wave radar 15. Further, the electronic device 1 obtains the position of the indicator (e.g., a user's finger) based on the obtained waveform signals (A11). The position of the indicator may be a position of a tip of the indicator that is closest to the display screen 131, or may include an entire region considered to be the indicator. When the user moves the indicator (A12), the electronic device 1 obtains the position of the indicator after the movement. For instance, until the electronic device 1 receives some operation, the electronic device 1 repeatedly obtains the position of the indicator at a particular timing (loop).

The print application 22 determines whether the obtained position of the indicator is close to the print execution object 61 (alt). For instance, the printing application 22 may determine that the obtained position of the indicator is close to the print execution object 61 when a distance between the position of the indicator and the print execution object 61 is within 5 cm. In another instance, the print application 22 may determine that the obtained position of the indicator is close to the print execution object 61 when the position of the indicator is directly above the print execution object 61. When determining that the obtained position of the indicator is close to the print execution object 61, the print application 22 transmits a return command to the printer 3 via the communication I/F 14 (A13).

When receiving the return command, the printer 3 starts a return operation to return from the sleep state to the non-sleep state (A14). For instance, a time of several seconds to over ten seconds is required from the start until the completion of the return operation by the printer 3 (A15).

When receiving an operation to the print execution object 61 on the print execution screen being displayed (A21), the print application 22 stops obtaining the position of the indicator (break). Then, the print application 22 generates a print command and performs a process to transmit the generated print command to the printer 3. Thereby, the electronic device 1 transmits a print command to the printer 3 (A22). After receiving the print command, the printer 3 waits for the completion of the return operation and then performs printing (A23).

Before the operation to the print execution object 61 is accepted, the indicator is positioned close to the print execution object 61. Namely, the electronic device 1 transmits the return command in A13 before transmitting the print command in A22. The printer 3 receives the return command transmitted in A13. Thereby, the printer 3 starts the return operation before receiving the print command. When the printer 3 receives the print command, the printer 3 performs printing immediately if the return operation has been completed. Thus, the time required until the printing is completed is likely to be shorter than when the return command is not transmitted in advance of the print command. It is noted that the printer 3 does not perform any operation when the printer 3 receives the return command in the non-sleep state.

Figure 5A:
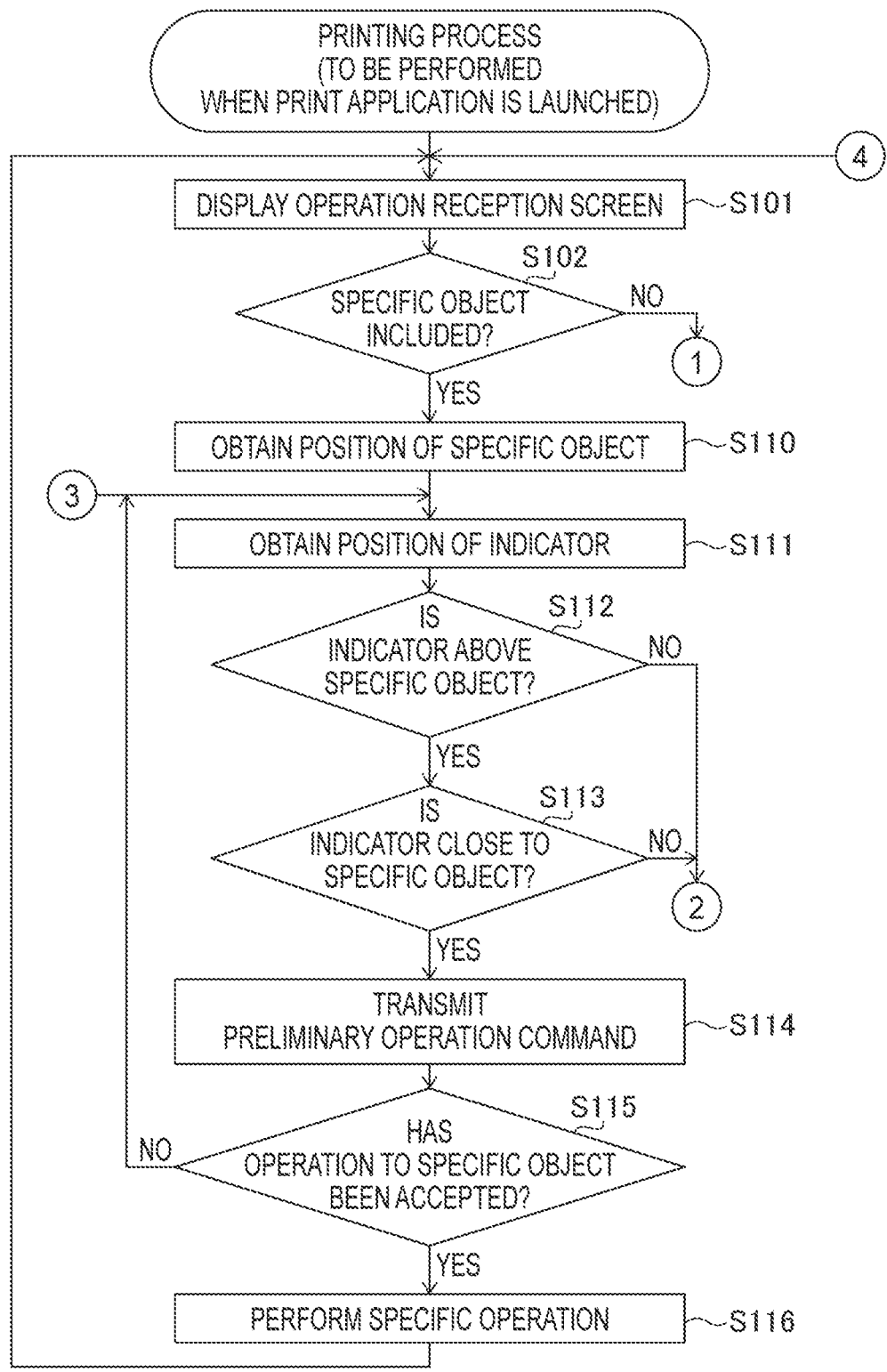
FIGS. 5A and 5B are flowcharts showing a procedure of a printing process to be performed by the electronic device executing a print application, in the illustrative embodiment according to one or more aspects of the present disclosure.
Figure 5B:
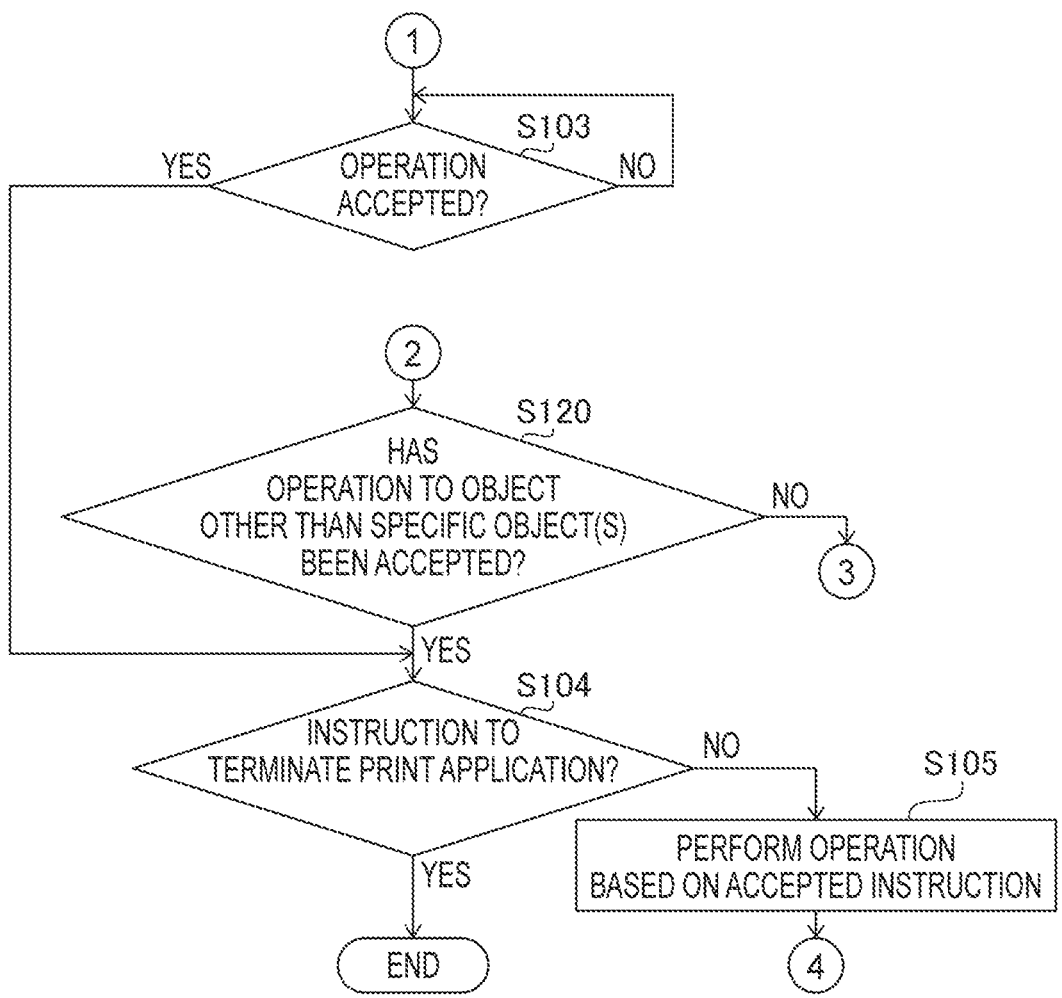

Subsequently, a procedure of a printing process according to the print application 22 will be described with reference to FIGS. 5A and 5B. The printing process is performed by the CPU 11 of the electronic device 1 in response to receipt of an instruction to perform the printing process from the print application 22. It is noted that the following operations and processes, including individual processing steps of the flowcharts shown in FIGS. 5A and 5B, basically indicate processing by the CPU 11 in accordance with instructions written in one or more programs. The processing by the CPU 11 includes hardware control using an API of the OS 21 for the electronic device 1. In the following description, individual operations and processes according to the one or more programs may be described with no mention of the OS 21.

In the printing process, the CPU 11 displays an operation reception screen on the display screen 131 of the user I/F 13 (S101). The operation reception screen is a screen for receiving user operations. Examples of the operation reception screen may include, but are not limited to, the top screen displayed immediately after the launch of the print application 22, the edit screen shown in FIG. 3, and the print execution screen shown in FIG. 4. The top screen displays a plurality of objects that include, for instance, an object for receiving an instruction to display how to use the print application 22, and an object for receiving an instruction to start producing a label. On each screen, the CPU 11 receives user operations to objects being displayed.

Then, the CPU 11 determines whether the display screen 131 being displayed includes a specific object (S102). The specific object is configured to, when operated by the indicator, receive an instruction to perform a specific operation. The print application 22 stores a preliminary operation command in association with each specific object. The preliminary operation command associated with a specific object is a command to cause the printer 3 to perform a preliminary operation. The preliminary operation, which is started before an operation to the specific object is accepted (i.e., before the instruction to perform the specific operation is received), may hasten completion of the specific operation to be performed when the operation to the specific object is accepted. More specifically, the preliminary operation command is transmitted to the printer 3 before the operation to the specific object is accepted, thereby causing the printer 3 to start the preliminary operation in advance. Thus, the specific operation may be completed sooner after the operation to the specific object is accepted.

Figure 4:
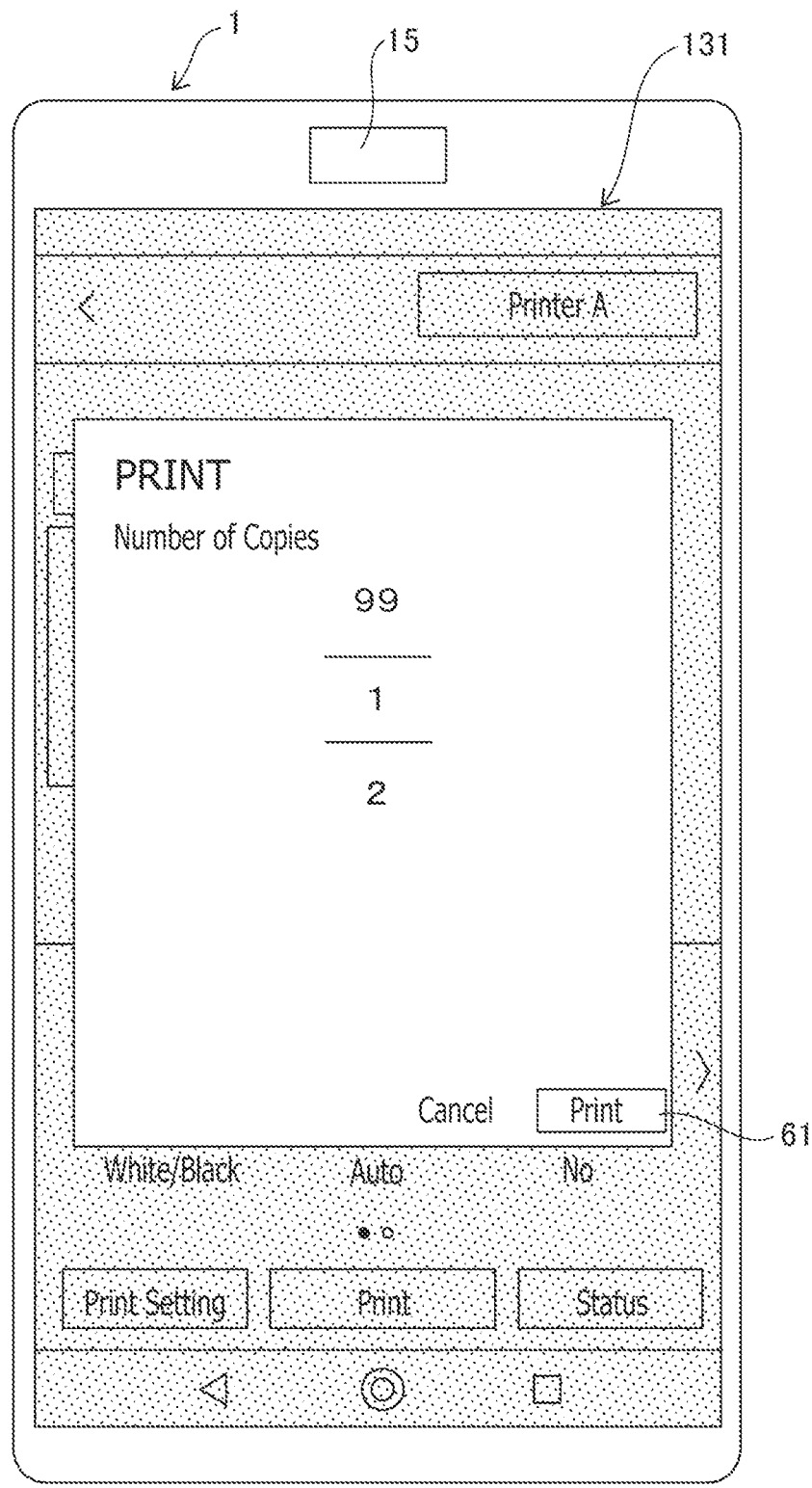
FIG. 4 shows an example of a print execution screen displayed on the electronic device in the illustrative embodiment according to one or more aspects of the present disclosure.

For instance, the print execution object 61 included in the print execution screen shown in FIG. 4 is configured to, before an operation to the print execution object 61 is accepted, cause the electronic device 1 to transmit the return command to the printer 3, thereby causing the printer 3 to start the return operation in advance. As a result, a time from when the operation to the print execution object 61 is accepted (i.e., when the print execution object 61 is operated by the indicator) until when the printer 3 completes producing a printed material may be reduced. Hence, the print execution object 61 is one of the specific objects. The specific operation to be performed when the operation to the print execution object 61 is accepted is a sequence of operations including generating the print command and transmitting the print command. The preliminary operation command associated with the print execution object 61 is the return command. The return operation performed by the printer 3 when the printer 3 receives the return command from the electronic device 1 is an example of the preliminary operation. The print execution screen including the print execution object 61 is one of screens each including one or more specific objects.

Further, for instance, the printer selection object 52 and the status object 55 on the edit screen shown in FIG. 3 are specific objects. The edit screen is one of the screens each including one or more specific objects.

The printer selection object 52 is an object for accepting selection of a printer to perform printing. The specific operation to be performed when an operation to the printer selection object 52 is accepted is a sequence of operations including transmitting a search command, receiving response command(s), displaying a list of devices that have responded to the search command, and accepting a selection from among the listed devices. Therefore, if the electronic device 1 transmits the search command to devices around the electronic device 1 before the operation to the printer selection object 52 is accepted, the electronic device 1 may receive a response command from the printer 3 in advance. If the electronic device 1 has already received the response command at the time when the operation to the printer selection object 52 is accepted, a time required to complete selecting a device may be shortened by displaying the list of the devices immediately after the acceptance of the operation to the printer selection object 52. The preliminary operation command associated with the printer selection object 52 is the search command. The operation of the printer 3 transmitting the response command in response to receipt of the search command from the electronic device 1 is an example of the preliminary operation.

The status object 55 is an object for receiving an instruction to display the status information of the printer 3. The specific operation to be performed when an operation to the status object 55 is accepted is a sequence of operations including transmitting the status command requesting the status information, receiving the status information, and displaying the received status information. Therefore, if the electronic device 1 transmits the status command to the printer 3 before the operation to the status object 55 is accepted, the electronic device 1 may obtain the status information from the printer 3 in advance. If the electronic device 1 has already obtained the status information at the time when the operation to the status object 55 is accepted, a time required until the status information is displayed may be shortened by displaying the status information immediately after the acceptance of the operation to the status object 55. The preliminary operation command associated with the status object 55 is the status command. The operation of the printer 3 transmitting the status information in response to receipt of the status command from the electronic device 1 is an example of the preliminary operation.

The preliminary operation may be a part of an operation accompanied by the specific operation or may be an operation separate from the specific operation. For instance, the operation of the printer 3 transmitting the response command, which is the preliminary operation associated with the printer selection object 52, is a part of an operation performed by the printer 3 as accompanied by transmission of the search command that is included in the specific operation associated with the printer selection object 52. Further, the operation of the printer 3 transmitting the status information, which is the preliminary operation associated with the status object 55, is a part of an operation performed by the printer 3 as accompanied by transmission of the status command that is included in the specific operation associated with the status object 55. On the other hand, the return operation, which is the preliminary operation associated with the print execution object 61, is not performed when the printer 3 is in the non-sleep state. In this case, the return operation is not a part of an operation performed by the printer 3 as accompanied by transmission of the print command that is included in the specific operation associated with the print execution object 61.

Further, the object, displayed on the top screen, for receiving an instruction to display how to use the print application 22 is an object having no preliminary operation command associated therewith. Therefore, the object is not a specific object. Namely, even if the electronic device 1 transmits some command to the printer 3 before an operation to the object is accepted, there is little possibility of reducing a time required to complete an operation performed in response to acceptance of the operation to the object.

When determining that the display screen 131 being displayed does not includes a specific object (S102: No), the CPU 11 determines whether an operation to an object being displayed has been accepted (S103). When determining that an operation to an object being displayed has not been accepted (S103: No), the CPU 11 waits until an operation to an object being displayed is accepted. Meanwhile, when determining that an operation to an object being displayed has been accepted (S103: Yes), the CPU 11 determines whether the accepted operation is an instruction to terminate the print application 22 (S104). When determining that the accepted operation is not the instruction to terminate the print application 22 (S104: No), the CPU 11 performs an operation based on the accepted instruction (S105). Afterward, the CPU 11 goes back to S101 and displays the operation reception screen. For instance, when accepting the instruction to display how to use the print application 22, the CPU 11 displays a corresponding screen on the user I/F 13 and waits for a next operation.

When determining that the display screen 131 being displayed includes a specific object (S102: Yes), the CPU 11 obtains position(s) of the specific object(s) in the display screen 131 (S110). When the operation reception screen displayed in S101 is the edit screen (see FIG. 3) or the print execution screen (see FIG. 4), the CPU 11 determines in S102 that the display screen 131 being displayed includes a specific object (S102: Yes). Then, when the edit screen (see FIG. 3) is displayed as the operation reception screen, in S110, the CPU 11 obtains the respective positions of the printer selection object 52 and the status object 55. When the print execution screen (see FIG. 4) is displayed as the print execution screen, in S110, the CPU 11 obtains the position of the print execution object 61.

Further, the CPU 11 obtains waveform signals output from the millimeter wave radar 15, and obtains information regarding a position and a movement of an object existing in the vicinity of the electronic device 1 based on the obtained waveform signals. Thereby, the CPU 11 obtains positional information of the object determined to be an indicator (e.g., a user's finger) (S111). The printing application 22 may obtain the waveform signals output from the millimeter wave radar 15, for instance, via the OS 21.

Based on the information obtained in S110 and S111, the CPU 11 determines whether the indicator is within a particular range from a specific object. Specifically, the CPU 11 first determines whether the position of the indicator is above a specific object (S112). For instance, the expression "above a specific object" represents a columnar range extending from an area of the specific object in a direction perpendicular to the display screen 131. If the position of the indicator is not within the columnar range extending from the area of the specific object in the direction perpendicular to the display screen 131, there is a possibility that an operation other than the operation to the specific object will be performed. Meanwhile, in this case, it is less likely that the operation to the specific object will be performed. In S112, the CPU 11 may make a negative determination (S112: No) if the position of the indicator is too far from the display screen 131. Further, "above a specific object" may not necessarily represent the columnar range extending from the area of the specific object in the direction perpendicular to the display screen 131. For instance, "above a specific object" may represent a range shaped to be wider as it is farther away from the display screen 131.

When determining that the position of the indicator is above a specific object (S112: Yes), the CPU 11 determines whether a distance between the position of the indicator and the specific object is within a predetermined distance (S113). The predetermined distance is previously stored in the print application 22. For instance, the predetermined distance may be 5 cm. It is noted that a range above the specific object and within the predetermined distance from the specific object may be referred to as a "particular range." The predetermined distance may be fixed or variable. When the predetermined distance is variable, the predetermined distance may be changed manually by a user's setting operation or automatically based on a type of the preliminary operation.

When determining that the distance between the position of the indicator and the specific object is within the predetermined distance (S113: Yes), the CPU 11 transmits the preliminary operation command to the printer 3 (S114). Thereby, the printer 3 starts a preliminary operation. The preliminary operation command transmitted in S114 is a command defined in association with the specific object to which the position of the indicator is determined to be close. Thus, an unnecessary preliminary operation is more likely to be avoided, by starting the preliminary operation when the position of the indicator is within the range extending from the area of the specific object in the direction perpendicular to the display screen 131 and within the predetermined distance from the specific object.

Instead of transmitting the preliminary operation command when determining that the position of the indicator is within the predetermined distance from the specific object, the CPU 11 may transmit the preliminary operation command when the position of the indicator continues to be within the predetermined distance from the specific object for a particular period of time. The particular period of time may be previously determined to be, for instance, 0.1 to 1 second. Namely, in this case, the preliminary operation command is not transmitted immediately after the position of the indicator comes within the predetermined distance from the specific object, but is transmitted when the position of the indicator continues to be within the predetermined distance from the specific object for the particular period of time. Thereby, it is possible to avoid an unnecessary preliminary operation when the indicator happens to pass near the specific object.

Further, the CPU 11 determines whether an operation to the specific object has been accepted (S115). When the indicator further approaches the specific object, and the CPU 11 determines that the operation to the specific object has been accepted (S115: Yes), the CPU 11 performs the specific operation associated with the specific object (S116).

For instance, when an operation to the printer selection object 52 is accepted on the edit screen, the CPU 11 performs, as the specific operation, a sequence of operations including displaying on the display screen 131 a list of devices that have transmitted the individual response commands, and determining a target device to be controlled based on a user's selection from among the listed devices. When the electronic device 1 previously receives the response command(s) transmitted in the preliminary operation, it is possible to make shorter a time required until the list of the devices is displayed than when the preliminary operation is not performed. In this case, it is expected that a time required until the target device to be controlled is determined may be reduced.

Further, for instance, when an operation to the status object 55 is accepted on the edit screen, the CPU 11 performs, as the specific operation, a sequence of operations including displaying the status information on the display screen 131 of the user OF 13. When the electronic device 1 previously receives the status information transmitted in the preliminary operation, it is expected to complete displaying the status information earlier than when the preliminary operation is not performed.

Further, for instance, when an operation to the print execution object 61 is accepted on the print execution screen, the CPU 11 performs, as the specific operation, a sequence of operations including transmitting the print command to the printer 3. When the printer 3 previously starts the return operation in the preliminary operation, it is expected to make shorter a time required to complete printing performed in response to receipt of the print command than when the preliminary operation is not performed.

After transmitting the preliminary operation command (S114), when the CPU 11 determines that an operation to the specific object has not been accepted (S115: No), the CPU 11 goes back to S111 to obtain the position of the indicator again. When the position of the indicator, obtained in S111 again after the transmission of the preliminary operation command in S114, is close to the same specific object (S113: Yes), there is no need to transmit the preliminary operation command again in S114. If the preliminary operation command is transmitted a plurality of times, it will cause a high load on the communication between the electronic device and the printer. Therefore, by not again transmitting the preliminary operation command when the indicator moves within the particular range close to the specific object, it is possible to reduce the communication load.

On the other hand, when determining that the position of the indicator is not above a specific object (S112: No) or that the distance between the position of the indicator and the specific object is not within the predetermined distance (S113: No), the CPU 11 determines whether an operation to an object other than the specific object(s) has been accepted (S120). When determining that an operation to an object other than the specific object(s) has not been accepted (S120: No), the CPU 11 goes back to S111 to obtain the position of the indicator again. Namely, the CPU 11 repeatedly obtain the position of the indicator while the screen including the specific object(s) is being displayed. It is noted that the CPU 11 may constantly obtain the position of the indicator in parallel with the printing process. In this case, in S111, the CPU 11 may use the latest information of the position of the indicator.

When determining that an operation to an object other than the specific object(s) has been accepted (S120: Yes), the CPU 11 proceeds to S104 to determine whether the accepted operation is the instruction to terminate the print application 22. When determining that the accepted operation is the instruction to terminate the print application 22 (S104: Yes), the CPU 11 erases the screen being displayed and terminates the printing process.

When determining that the accepted operation is an instruction other than the instruction to terminate the print application 22 (S104: No), the CPU 11 performs an operation based on the accepted instruction (S105). After S105 or S116, the CPU 11 goes back to S101 and displays the operation reception screen on the display screen 131 of the user I/F 13 based on the user's instruction.

For instance, when an operation to the print object 54 is accepted on the edit screen (see FIG. 3), the CPU 11 displays the print execution screen (see FIG. 4) on the user I/F 13 in S101, since the operation to the print object 54 is not an operation to a specific object or the instruction to terminate the print application 22. Then, in S102, the CPU 11 determines whether there is a specific object on the print execution screen being displayed. It is noted that the print execution screen may include one or more specific objects other than the print execution object 61. In this case, in S110, the CPU 11 may obtain positions of the said one or more specific objects as well.

If the printer 3 is required to preheat the print head prior to the start of printing, the electronic device 1 may cause the printer 3 to start preheating the print head as a preliminary operation associated with the print execution object 61. Specifically, when the CPU 11 determines that the indicator is positioned close to the print execution object 61, the CPU 11 may transmit, as a preliminary operation command, a preheating command to instruct the printer 3 to perform a preheating operation. When receiving the preheating command, the printer 3, if in the sleep state, may perform the return operation and then perform the preheating operation. Namely, the preheating operation may be an example of a "preparatory operation" to be performed by the printer 3 in advance of printing, to render the printer 3 ready to perform printing. When the printer 3 starts preheating the print head in the preliminary operation, it is expected to complete printing earlier than when the printer 3 receives the print command without preheating the print head. Further, if the printer 3 is allowed to start printing earlier by preliminarily beginning to feed the print medium, the electronic device 1 may transmit a command to feed the print medium as a preliminary operation command.

As described in detail above, according to aspects of the present disclosure, the print application 22 obtains the position of the indicator (e.g., a user's finger) and instructs the printer 3 to perform the preliminary operation when the indicator is within the particular range from the specific object. The indicator is brought within the particular range from the specific object before the specific object is operated therewith. When the preliminary operation associated with the specific operation is started in advance of an input of an instruction to perform the specific operation, it is expected that the specific operation may be completed earlier than when the preliminary operation is not performed in advance. In addition, it is unlikely that the user will not operate the specific object with the indicator even after bringing the indicator within the particular range from the specific object. Therefore, it is also unlikely that the preliminary operation, started when the indicator is brought within the particular range, is wasted.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

The electronic device 1 is not limited to a portable device, but may be a stationary type device such as a personal computer.

For instance, the printer 3 connected with the electronic device 1 is not limited to a label printer, but may be an inkjet printer or a laser printer. In other words, the printing method for the printer 3 is not limited to the thermal transfer method, but may be, for instance, a thermal method, an inkjet method, or an electrophotographic method. The print medium used for the printer 3 is not limited to the label sheet, but may be, for instance, roll paper or cut paper. The printer 3 may not be provided with the user I/F 33.

In the aforementioned illustrative embodiment, the print application 22 obtains the position of the indicator based on the waveform signals output from the millimeter wave radar 15 (more exactly, the print application 22 is configured to, when executed by the CPU 11, cause the electronic device 1 to obtain the position of the indicator based on the waveform signals output from the millimeter wave radar 15). However, for instance, there may be another program to obtain the position of the indicator based on the waveform signals output from the millimeter wave radar 15. For instance, the OS 21 may obtain the position of the indicator, and the print application 22 may obtain information on the position of the indicator from the OS 21. In the aforementioned illustrative embodiment, the millimeter wave radar 15 is used to obtain the information on the position of the indicator. However, one or more other devices such as a camera, an infrared radiation sensor, and an optical sensor may be used solely or in combination to obtain the information on the position of the indicator.

For instance, the printing application 22 may have options as to whether to output the preliminary operation command. In this case, the print application 22 may accept user's manual operations to switch between the options. Additionally or alternatively, the print application 22 may automatically switch between the options after a lapse of a particular time since the last specific operation.

In the aforementioned illustrative embodiment, the electronic device 1 obtains the position of the indicator when the screen being displayed includes a specific object. However, the electronic device 1 may obtain the position of the indicator regardless of whether the screen being displayed includes a specific object. For instance, the electronic device 1 may periodically obtain the position of the indicator during execution of the print application 22.

In the aforementioned illustrative embodiment, the user I/F 13 of the electronic device 1 includes the touch panel. However, the user I/F 13 may not include the touch panel. The user I/F 13 may include, for instance, a combination of a display and an input device such as a keyboard and a mouse. In this case, each button displayed on the display may be an example of an object. In addition, the millimeter wave radar 15 may be disposed around the display. Even in such a case, the user may bring an indicator (e.g., a user's finger) close to an object before operating the object by moving a cursor via the input device, thereby instructing the printer 3 to perform the preliminary operation.

Examples of the indicator to be detected may include, but are not limited to, a stylus and a touch pen as well as a user's finger. Hence, even if the indicator is a user's finger, there is no need to determine whether the detected indicator is a finger. In this case, when the user's finger is positioned close to a specific object, the preliminary operation command associated with the specific object may be transmitted to the printer 3. The same may apply to a case where the indicator is a stylus or a touch pen.

Further, in any flowchart shown in the aforementioned illustrative embodiment, a plurality of operations and processes in any plurality of steps may be performed in an arbitrarily-changed order, or may be performed in parallel, to such an extent that there is no inconsistency in the resulting processing.

The operations and processes shown in the aforementioned illustrative embodiment may be performed, solely or in combination by at least one of hardware elements such as CPUs, ASICs, and logical integrated circuits. In addition, the operations and processes shown in the aforementioned illustrative embodiment may be achieved in various forms such as a storage medium storing one or more programs for performing the operations and processes, and a method.

The following shows examples of associations between elements exemplified in the aforementioned illustrative embodiment and modifications and elements according to aspects of the present disclosure. The electronic device 1 may be an example of an "electronic device" according to aspects of the present disclosure. The CPU 11 may be an example of a "processor" according to aspects of the present disclosure. The user I/F 13 may be an example of a "display" according to aspects of the present disclosure. The display screen 131 of the user I/F 13 may be an example of a "screen" of the "display" according to aspects of the present disclosure. The millimeter wave radar 15 may be an example of a "millimeter wave radar" according to aspects of the present disclosure. The memory 12 may be an example of a "non-transitory computer-readable medium" according to aspects of the present disclosure, and may be an example of a "memory" according to aspects of the present disclosure. The print application 22 may be an example of "computer-readable instructions" according to aspects of the present disclosure. The controller 10 may be an example of a "controller" according to aspects of the present disclosure. The CPU 11 and the memory 12 storing the print application 22 may be included in the "controller" according to aspects of the present disclosure. The printer 3 may be an example of an "image processing device" according to aspects of the present disclosure.

What is claimed is:

1. A non-transitory computer-readable medium storing computer-readable instructions executable by a processor of an electronic device comprising a millimeter wave radar and a display, the instructions being configured to, when executed by the processor, cause the electronic device to:
    display an object on a screen of the display, the object being configured to, when operated by an indicator, receive an instruction to cause the electronic device to perform a specific operation, the specific operation including controlling an image processing device;
    obtain a position of the object in the screen of the display;
    obtain a position of the indicator based on output signals from the millimeter wave radar, at least while the object is displayed on the screen of the display;
    determine a range of the indicator to the object based on the obtained position of the indicator and the obtained position of the object;
    determine whether to transmit a preliminary operation command to the image processing device, based on whether the determined range of the indicator to the object is within a particular range of the indicator to the object, the preliminary operation command instructing the image processing device to start a preliminary operation to shorten a time required to complete the specific operation; and
    when the determined range of the indicator to the object is within the particular range of the indicator to the object, transmit the preliminary operation command to the image processing device.

2. The non-transitory computer-readable medium according to claim 1,
    wherein the specific operation includes transmitting an image processing command to the image processing device, the image processing command instructing the image processing device to perform image processing, and
    wherein the preliminary operation is an operation to be performed by the image processing device in advance of the image processing.

3. The non-transitory computer-readable medium according to claim 2,
    wherein the preliminary operation is a return operation to bring the image processing device from a sleep state into a non-sleep state, the sleep state being a state in which the image processing device consumes less electric power than when in the non-sleep state and is unable to perform the image processing, and
    wherein the instructions are further configured to, when executed by the processor, cause the electronic device to transmit the preliminary operation command instructing the image processing device to perform the return operation, the image processing device, if in the sleep state, switching into the non-sleep state when receiving the preliminary operation command.

4. The non-transitory computer-readable medium according to claim 2,
    wherein the specific operation includes transmitting a print command to the image processing device, the print command instructing the image processing device to perform printing,
    wherein the preliminary operation is a preparatory operation to be performed by the image processing device in advance of the printing, to render the image processing device ready to perform the printing, the image processing device starting the printing after completion of the preparatory operation when receiving the print command, and
    wherein the instructions are further configured to, when executed by the processor, cause the electronic device to transmit the preliminary operation command instructing the image processing device to perform the preparatory operation, the image processing device starting the preparatory operation when receiving the preliminary operation command.

5. The non-transitory computer-readable medium according to claim 1,
    wherein the specific operation includes:
        transmitting a search command to search for devices connected with the electronic device;
        displaying on the display a list of devices each of which has transmitted a response command to the search command, the image processing device transmitting the response command to the electronic device when receiving the search command; and
        accepting a selection of a target device to be controlled from among the devices listed on the display, and
    wherein the instructions are further configured to, when executed by the processor, cause the electronic device to transmit the search command to the image processing device as the preliminary operation command.

6. The non-transitory computer-readable medium according to claim 1,
    wherein the specific operation includes:
        transmitting a status command to request the image processing device to transmit status information on the image processing device, the image processing device transmitting the status information to the electronic device when receiving the status command; and
        displaying on the display the status information received from the image processing device, and
    wherein the instructions are further configured to, when executed by the processor, cause the electronic device to transmit the status command to the image processing device as the preliminary operation command.

7. The non-transitory computer-readable medium according to claim 1,
    wherein the instructions are further configured to, when executed by the processor, cause the electronic device to, when the obtained position of the indicator is in a direction perpendicular to the screen of the display from the obtained position of the object, determine whether to transmit the preliminary operation command to the image processing device, based on whether the determined range of the indicator to the object is within the particular range of the indicator to the object.

8. The non-transitory computer-readable medium according to claim 1,
    wherein the instructions are further configured to, when executed by the processor, cause the electronic device to transmit the preliminary operation command to the image processing device when the obtained position of the indicator changes from outside the particular range to within the particular range.

9. The non-transitory computer-readable medium according to claim 1, wherein the instructions are further configured to, when executed by the processor, cause the electronic device to transmit the preliminary operation command to the image processing device when the obtained position of the indicator continues to be within the particular range for a particular period of time after the obtained position of the indicator changes from outside the particular range to within the particular range.

10. The non-transitory computer-readable medium according to claim 1,
wherein the millimeter wave radar is configured to transmit electromagnetic waves having wavelengths on an order of millimeters or less, receive reflected waves of the electromagnetic waves from the indicator, and output waveform signals based on the received reflected waves, thereby enabling the electronic device to obtain the position of the indicator based on the output waveform signals from the millimeter wave radar.

11. An electronic device comprising:
a millimeter wave radar;
a display; and
a controller configured to:
  display an object on a screen of the display, the object being configured to, when operated by an indicator, receive an instruction to cause the electronic device to perform a specific operation, the specific operation including controlling an image processing device;
  obtain a position of the object in the screen of the display;
  obtain a position of the indicator based on output signals from the millimeter wave radar, at least while the object is displayed on the screen of the display;
  determine a range of the indicator to the object based on the obtained position of the indicator and the obtained position of the object;
  determine whether to transmit a preliminary operation command to the image processing device, based on whether the determined range of the indicator to the object is within a particular range of the indicator to the object, the preliminary operation command instructing the image processing device to start a preliminary operation to shorten a time required to complete the specific operation; and
  when the determined range of the indicator to the object is within the particular range of the indicator to the object, transmit the preliminary operation command to the image processing device.

12. The electronic device according to claim 11,
wherein the millimeter wave radar is configured to transmit electromagnetic waves having wavelengths on an order of millimeters or less, receive reflected waves of the electromagnetic waves from the indicator, and output waveform signals based on the received reflected waves, thereby enabling the electronic device to obtain the position of the indicator based on the output waveform signals from the millimeter wave radar.

13. The electronic device according to claim 11,
wherein the controller comprises:
  a processor; and
  a memory storing computer-readable instructions configured to, when executed by the processor, cause the controller to:
    display the object on the screen of the display;
    obtain the position of the object in the screen of the display;
    obtain the position of the indicator based on the output signals from the millimeter wave radar, at least while the object is displayed on the screen of the display;
    determine the range of the indicator to the object based on the obtained position of the indicator and the obtained position of the object;
    determine whether to transmit the preliminary operation command to the image processing device, based on whether the determined range of the indicator to the object is within the particular range of the indicator to the object; and
    when the determined range of the indicator to the object is within the particular range of the indicator to the object, transmit the preliminary operation command to the image processing device.

14. A method implementable on a processor of an electronic device comprising a millimeter wave radar and a display, the method comprising:
  displaying an object on a screen of the display, the object being configured to, when operated by an indicator, receive an instruction to cause the electronic device to perform a specific operation, the specific operation including controlling an image processing device;
  obtaining a position of the object in the screen of the display;
  obtaining a position of the indicator based on output signals from the millimeter wave radar, at least while the object is displayed on the screen of the display;
  determining a range of the indicator to the object based on the obtained position of the indicator and the obtained position of the object;
  determining whether to transmit a preliminary operation command to the image processing device, based on whether the determined range of the indicator to the object is within a particular range of the indicator to the object, the preliminary operation command instructing the image processing device to start a preliminary operation to shorten a time required to complete the specific operation; and
  when the determined range of the indicator to the object is within the particular range of the indicator to the object, transmitting the preliminary operation command to the image processing device.

* * * * *